United States Patent [19]
Brown

[11] 3,811,439
[45] May 21, 1974

[54] APPARATUS FOR CLINICAL MEASUREMENT OF BLOOD PRESSURE IN A CARDIO-VASCULAR SYSTEM

[75] Inventor: Henry E. Brown, Slough, England

[73] Assignee: Wilkinson Sword Limited, London, England

[22] Filed: Aug. 28, 1972

[21] Appl. No.: 284,432

[30] Foreign Application Priority Data
Sept. 8, 1971   Great Britain............... 41812/71

[52] U.S. Cl......... 128/2.05 M, 73/391, 128/2.05 Q, 346/45, 346/72, 346/139 C
[51] Int. Cl............................................. A61b 5/02
[58] Field of Search.... 128/2.05 A, 2.05 G, 2.05 M, 128/2.05 Q, 2.05 R; 73/391; 346/4, 45, 72, 139 C, 139 R

[56] References Cited
UNITED STATES PATENTS

| | | | |
|---|---|---|---|
| 3,741,199 | 6/1973 | Sharpe............... | 128/2.05 M |
| 2,875,750 | 3/1959 | Boucke et al............... | 128/2.05 A |
| 3,118,440 | 1/1964 | De Dobbeleer............... | 128/2.05 A |
| 1,970,819 | 8/1934 | Reynolds et al............... | 73/391 |
| 2,980,107 | 4/1961 | Hurley et al............... | 128/2.05 Q |
| 3,660,164 | 11/1953 | Hasbrouck, Jr............... | 128/2.05 Q |
| 2,436,971 | 3/1948 | Moore............... | 346/72 |
| 2,827,619 | 3/1958 | Fryklund............... | 346/139 R |
| 2,447,018 | 8/1948 | Keinath............... | 128/2.05 Q |

FOREIGN PATENTS OR APPLICATIONS

| | | | |
|---|---|---|---|
| 473,576 | 7/1969 | Switzerland............... | 128/2.05 Q |
| 166,098 | 9/1963 | U.S.S.R............... | 128/2.05 Q |

Primary Examiner—William E. Kamm
Attorney, Agent, or Firm—Wolfe, Hubbard, Leydig, Voit & Osann, Ltd.

[57] ABSTRACT

Blood pressure measuring apparatus comprises a cuff arrangement for encircling the patient's limb, and a pump for pressurising the cuff above the systolic pressure. A pivotally mounted lever carries a pen moving over a chart, and the cuff pressure is allowed to leak away and is caused to pivot the lever so that the pen draws a line on the chart. The lever also carries a motor drivingly connected to oscillate the pen, transverse to this line, in response to pressure fluctuations in the cuff caused by the patient's blood flow pulsations. The motor is mounted either at the pivot axis of the lever or on the opposite side thereof to the pen. The lever may be driven, in response to the cuff pressure, by a bellows arrangement, or alternatively it may be servo-driven in response to this pressure.

14 Claims, 7 Drawing Figures

APPARATUS FOR CLINICAL MEASUREMENT OF BLOOD PRESSURE IN A CARDIO-VASCULAR SYSTEM

The invention relates to the clinical measurement of blood pressure in a cardio-vascular system.

According to the invention, there is provided apparatus for clinical measurement of systolic and diastolic blood pressure in a cardio-vascular system, comprising cuff means for encircling part of the patient where the blood pressure is to be determined, a reservoir in pressure connection with the cuff means for temporarily storing pressure in itself and in the cuff means above the systolic level, a pressure leak allowing the reservoir and cuff pressure to fall progressively, a pivotally mounted lever having mounted thereon at a position spaced from its pivot axis a recording medium marking element which is movable relative to the lever in directions transverse to the directions of movement of the lever, first pressure-responsive means responsive to the pressure in the reservoir and the cuff means and connected to the lever to pivot the lever about its pivot axis in response to changes in the pressure, an electric motor mounted on the lever at such a position that its weight produces substantially no moment about the pivot axis tending to assist the moment produced thereabout by the weight of the lever and marking element, the motor being drivingly connected to the marking element to move the marking element when energised, and second pressure-responsive means responsive to pressure variations in the cuff means, caused by blood pulsations in the said part of the patient as the cuff pressure falls, to energise the motor correspondingly.

According to the invention, there is also provided apparatus for clinical measurement of systolic and diastolic blood pressure in a cardio-vascular system, comprising cuff means for encircling part of the patient where the blood pressure is to be determined, a reservoir in pressure connection with the cuff means for temporarily storing pressure in itself and in the cuff means above the systolic level, a pressure leak allowing the reservoir and cuff pressure to fall progressively, a pivotally mounted lever having mounted thereon at a position spaced from its pivot axis a recording medium marking element which is movable relative to the lever in directions transverse to the directions of movement of the lever, first pressure-responsive means responsive to the pressure in the reservoir and the cuff means and connected to the lever to pivot the lever about its pivot axis in response to changes in the pressure, an electric motor mounted on the lever adjacent the pivot axis and drivingly connected to the marking element so as to move the marking element when energised, and second pressure-responsive means responsive to pressure variations in the cuff means, caused by blood pulsations in the said part of the patient as the cuff pressure falls, to energise the motor correspondingly.

According to the invention, there is further provided apparatus for clinical measurement of systolic and diastolic blood pressure in a cardio-vascular system, comprising cuff means for encirling part of the patient where the blood pressure is to be determined, a reservoir in pressure communication with the cuff means for temporarily storing pressure in itself and in the cuff means above the systolic level, a pressure leak allowing the reservoir and cuff pressure to fall progressively, a pivotally mounted lever carrying a recording medium marking element which is mounted on and spaced from the pivot axis of the lever for movement relative to the lever in directions transverse to the directions of pivotting lever movement, first pressure-responsive means responsive to the pressure in the reservoir and the cuff to produce a corresponding signal, servo means responsive to the said signal and to the position of the lever to change the angular position of the lever in correspondence with the value of the said signal whereby the movement of the lever follows the reservoir and cuff pressure, an electric motor mounted on the lever and drivingly connected to move the marking element in the said transverse directions, and second pressure-responsive means responsive to the pressure variations in the cuff means which are superimposed on the reservoir and cuff pressure, and caused by blood pulsations in the said part of the patient as the cuff pressure falls, to energise the electric motor whereby to oscillate the marking element in the said transverse directions.

Various forms of a clinical blood pressure recorder embodying the invention will now be described, by way of example only, with reference to the accompanying drawings in which.

Figure 1:
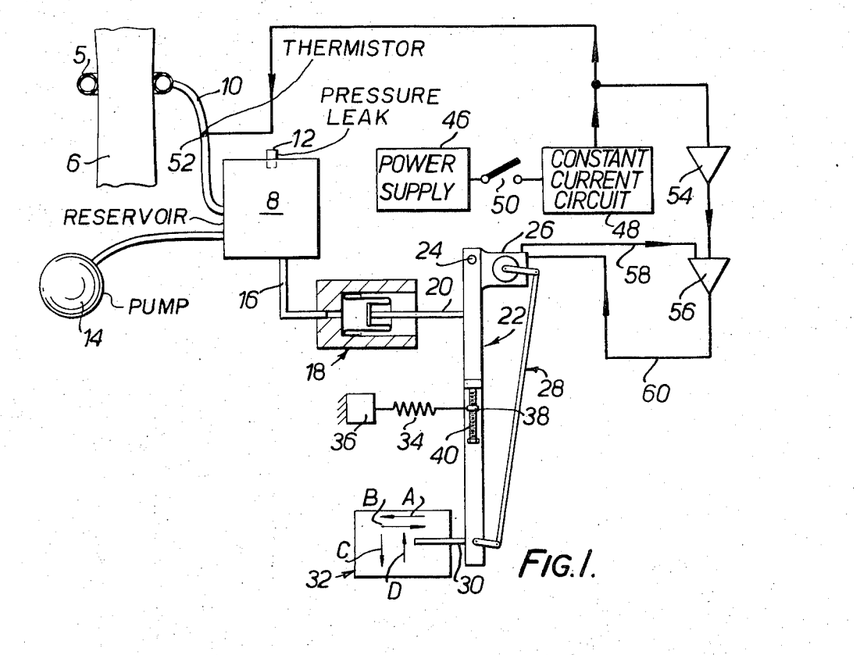
FIG. 1 is a schematic diagram (partly in section) of one form of the recorder.

The recorder of FIG. 1 is for providing a record from which the systolic and diastolic pressure of a patient can be read off by a medical practitioner, the actual operator having a minimum of skill and training.

As shown in FIG. 1, the apparatus comprises a cuff 5 which is positioned so as to encircle a limb 6 of the patient containing the blood vessel in which the blood pressure is to be recorded. The cuff 5 may comprise a rubber bladder enclosed within a cloth outer cover, and the bladder is connected to a reservoir 8 by means of a pressure connection 10. The reservoir has a leak valve 12 through which pressure in the reservoir can leak to atmosphere at a rate of approximately three millimetres of mercury per second. The interior of the reservoir is coupled to a pump 14 in the form of a manually operable ball pump, and a further pressure connection 16 from the reservoir leads to a rolling diaphragm piston-cylinder assembly 18. The piston-cylinder assembly 18 controls the movement of a piston rod 20 which is connected to a second-order lever 22 pivoted at a pivot point 24. Near its pivot point 24, the lever 22 carries an electric motor 26 whose drive shaft is connected by a linkage 28 to a pen or stylus 30 which is positioned immediately above a platform 32 on which a chart can be clamped. It will thus be seen that pivotal movement of the lever 22 about its pivot point 24 will cause the pen 30 to move over the platform 32 in the directions of the arrows A and B and to mark the chart accordingly, while angular rotation of the motor 26 will cause the pen to move over the platform in the directions of the arrows C and D and to mark the chart accordingly (it will be appreciated that each of these movements is not absolutely straight as indicated by the arrows, but is slightly curved).

Pivotal movement of the lever 22 is controlled by a tension spring 34 which is anchored to a block 36 at one end, while at its other end is attached to a nut 38 engaging a screw 40 which is rotatably mounted on the lever 22.

The electrical circuit of the recorder will be described in detail later with reference to FIGS. 6A and 6B. Briefly as shown in FIG. 1, it comprises a power source 46, which may comprise a dry battery, which feeds the constant current circuit 48 through a switch 50. When energised, the circuit 48 supplies constant current to a thermistor 52 or other temperature-dependent resistance mounted within the pressure connection 10 so as to be susceptible to the flow of air therealong. An amplifier 54 detects changes in voltage across the thermistor 52 resulting from changes in its resistance, and applies an amplified control signal to one input of a servo amplifier 56. The other input of the amplifier 56 is fed on a line 58 with a feedback signal from a potentiometer (not shown) which responds to the instantaneous angular position of the shaft of the motor 26. The amplifier output on a line 60 drives the motor.

In operation, the cuff 5 is placed in position around the patient's limb and inflated, by means of the pump 14, to a pressure higher than the systolic pressure. The resultant rise in the pressure in the cuff 5 and in the reservoir 8 causes the piston-cylinder assembly 18 to turn the lever 22 in an anti-clockwise direction about the pivot 24. With a chart in position on the platform 32, the pen 30 thus moves in the direction of the arrow B, this being the direction of increasing pressure on a pressure axis of the chart. Switch 50 is now closed, and pumping is stopped so that the pressure in the reservoir 8 and in the cuff 5 begins to fall as a result of the leak valve 12, causing the lever 22 to pivot in a clockwise direction so as to move the pen 30 in the direction of the arrow A.

While the cuff pressure is above the systolic value, the blood vessel in the patient's limb is occluded and no blood flows. When the pressure has fallen to the systolic level, however, the blood pressure becomes sufficient at the high pressure point in each cardiac cycle to force a pulse of blood through the blood vessel. The resultant blood flow pulsation causes a corresponding pulse of air in the pressure connection 10, and this results in a change in resistance in the thermistor 52. A voltage signal is therefore picked up by the amplifier 54, amplified, and applied to the servo amplifier 56. The latter produces an output signal which causes the motor 26 to turn its shaft in such a direction as to produce a feedback signal on line 58 which balances the control signal from the amplifier 54. The motor shaft thus follows the voltage pulse produced as a result of the blood flow pulsation, and the pen oscillates across the chart in the directions of the arrows C and D to indicate the systolic pressure.

As the cuff and reservoir pressure continues to fall, with the pen 30 moving in the direction of the arrow A, the motor 26 continues to oscillate the pen 30 in the directions of the arrows C and D. The pen oscillations are related to the magnitude of the blood pulsations. The diastolic pressure can also be determined from the resultant trace and is indicated by a decrease in the amplitude of the oscillations.

Although only one cuff 5 has been shown, it may be advantageous to use two cuffs each joined by a separate pressure connection to the reservoir 8, with the thermistor 52 mounted in one of these pressure connections. In such an arrangement, the bladders of the two cuffs may be arranged to overlap slightly.

Instead of a rolling diaphragm piston-cylinder assembly 18, a bellows arrangement can be used.

Rotation of the screw 40 shifts the nut 38 along the length of the lever 22 to compensate for variations of spring stiffness. A screw adjustment (not shown) between spring 34 and block 36 enables adjustment of the zero setting of the lever.

An arrangement of pulleys or sprockets with belts or chains may be used to take the drive from the motor shaft to the pen instead of the linkage 28.

The positioning of the motor 26 near the pivot point 24 is advantageous in that it aids balancing of the lever. However, if desired, the motor may be mounted at the distal end of the lever, possibly having the pen 30 directly attached to its shaft.

Although FIG. 1 shows the lever 22 as being of second-order form, instead a first-order lever may be used if desired with the piston rod 20 acting on the lever on one side of the pivot point, and with the pen 30 at the end of the lever on the other side of the pivot point. Again, the motor 26 can be mounted with advantage at the pivot point of the lever. With such a first-order lever arrangement, the spring 34 may be attached to a nut engaging a screw rotatably extending from a distal end of the lever.

Figure 2:
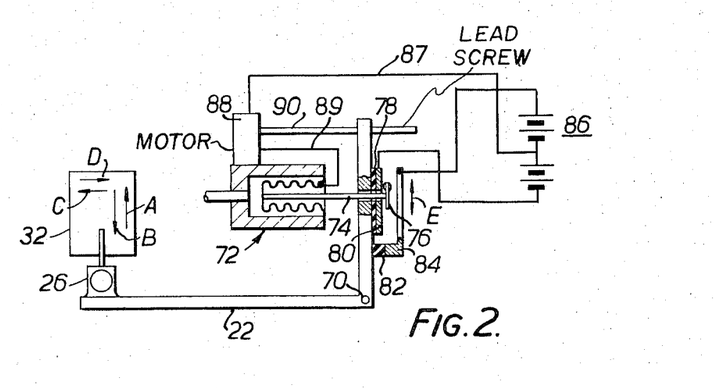
FIG. 2 is a schematic diagram (partly in section) showing a modification to part of the recorder of FIG. 1.

FIG. 2 shows a modification to the manner in which the lever 22 is angularly moved, and items in FIG. 2 corresponding to items in FIG. 1 are similarly referenced. The cuff 5, the reservoir 8, and the pump 14, and the interconnections between them, are unchanged, as is the electrical circuit for energising the motor 26.

As shown in FIG. 2, the lever 22 is arranged as a first-order lever, pivoted at a point 70, instead of as a second-order lever, and has the motor 26 mounted at one of its distal ends, the pen 30 being directly attached to the motor shaft.

In addition, the rolling diaphragm piston-cylinder assembly 18 is replaced by a bellows arrangement 72. The shaft 74 of this bellows arrangement is not attached to the lever 22 but passes, with clearance, through the lever, is electrically conductive, and carries a movable contact 76 at its distal end. Attached to the side of the lever 22 opposite to the bellows arrangement 72 is an electrically insulating plate 78 carrying a conductive contact plate 80, the rod 74 passing with insulating clearance through both of these plates. An electrically insulating block 82 supports a further, cantilevered, contact 84.

Contact 84 and contact 80 are respectively connected to opposite polarity terminals of a centre-tapped battery 86. The centre tap of this battery is connected via a lead 87 to one terminal of a d.c. motor 88 which is rigidly attached to the housing of the bellows arrangement 72. The other terminal of the motor 88 is connected via the electrically conductive bellows of the bellows arrangement 72 and a lead 89 to the rod 74.

The shaft 90 of the motor 88 is in the form of a lead screw and is threadably engaged with a nut (not shown) which is housed in a distal end of the lever 22 so as to be prevented from rotating about the axis of the lead screw but allowed slight play about axes perpendicular to this axis.

In operation, the cuff and reservoir pressure is raised above the systolic level as before. This expands the bellows arrangement 72 and moves the contact 76 into engagement with the contact 84. The motor 88 is thus energised with its lead 89 held positive with respect to its lead 87, and the direction of motor rotation is such that the rotating lead screw 90 cooperates with the nut so as to turn the lever 22 in a clockwise direction about the pivot point 70. Lever movement ceases when contacts 76 and 84 separate.

As the cuff and reservoir pressure falls from the systolic level, the bellows arrangement 72 moves the rod 74 to the left, bringing the contact 76 into engagement with the contact plate 80. The motor 88 is thus energised with its lead 89 held negative with respect to its lead 87, and the motor rotates in the opposite direction and moves the lever 22 anti-clockwise about the pivot 70 until contact 76 separates from contact plate 80.

Motor 26 oscillates the pen 30 in the directions of the arrows C and D while the cuff and reservoir pressure falls, in the manner explained in connection with FIG. 1.

The arrangement of FIG. 2 thus provides a positive control of the lever position which is unaffected by the position or balance of the lever if the recorder is used in a tilted position.

It will be appreciated that the arrangement of FIG. 2 can be modified by using a rolling diaphragm piston-cylinder assembly instead of the bellows arrangement 72. Furthermore, or alternatively, the motor 26 may be mounted adjacent the pivot point 70 and connected to the pen 30 by suitable linkage.

In a further modification, the arrangement of FIG. 2 can be constructed with the lever 22 arranged in second-order form instead of the first-order form as shown.

The contact 76 may be arranged to be slidable in the directions of the arrow E so as to compensate for variations in the effective stiffness of the bellows.

Figure 3:
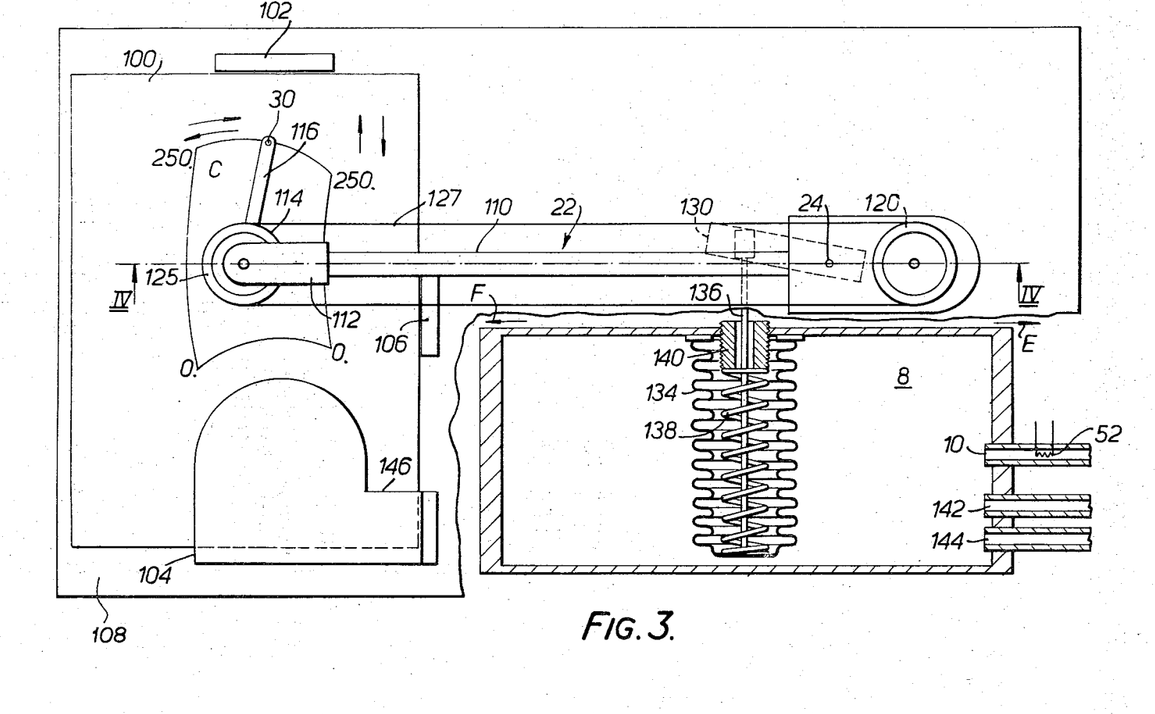
FIG. 3 is a plan view of part of a further form of the recorder showing the pen mechanism with some items broken away and some in section to reveal the interior mechanism.
Figure 4:
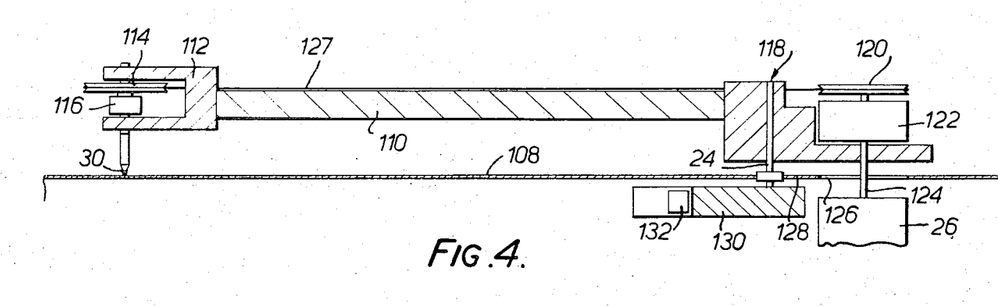
FIG. 4 is a section on the line IV—IV of FIG. 3.
Figure 5:
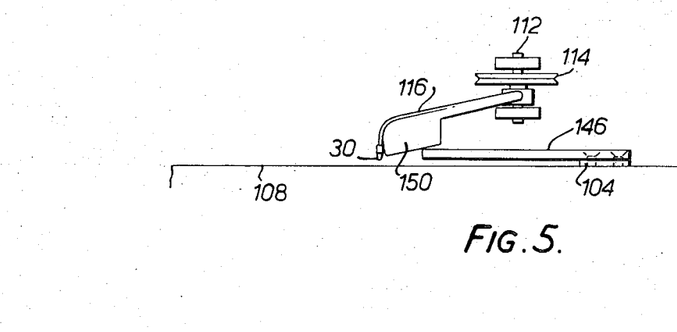
FIG. 5 is an end view corresponding to FIG. 3, but showing the pen mechanism in a slightly different position.

FIGS. 3, 4 and 5 show another form of the recorder, and items in these Figures corresponding to items in FIGS. 1 and 2 are similarly referenced.

FIG. 3 shows a plan view of the recorder and shows the chart 100 located between guides 102, 104 and 106 on a horizontal base plate 108. The lever 22 is of second order from and is rigidly attached to a vertical pivot shaft 24 which is rotatably supported in the base plate 108. As shown most clearly in FIG. 4, the lever 22 comprises a rod portion 110 supporting a forked end 112 in which is pivotally mounted a pulley 114. The latter is rigidly connected to the end of an arm 116 to which is attached the pen 30. At its opposite end, the rod 110 supports an enlarged pivot block 118 which is stepped to receive a further pulley 120. The latter is coupled, by a drive assembly 122 and a shaft 124 which passes through a hole 126 in the base 108, to the electric drive motor 26. Pulleys 114 and 120 are coupled by a drive cord 127.

The pivot shaft 24 passes through the base plate 108 to which it is rotatably attached by means of a bearing 128, and is rigidly coupled to a ratio arm 130. The distal end of this arm supports a pivotally mounted block 132.

The recorder of FIGS. 3 to 5 incorporates a bellows arrangement 134 which replaces the rolling diaphragm piston-cylinder assembly 18 of FIG. 1. The bellows arrangement 134 responds to the pressure in the reservoir 8 in the same manner as the piston-cylinder assembly 18 of FIG. 1, but is mounted actually within the reservoir 8, with the interior of the bellows open to atmosphere. In this way, the bellows arrangement expands and contracts according to the pressure in the reservoir. A rod 136 is attached at one of its ends to the closed-off end of the bellows and, at the other of its ends, to the block 132 on the ratio arm 130. The cover 108 in FIG. 3 is broken away to reveal the reservoir 8 which is itself shown in section.

A swamping spring 138 is mounted inside the bellows arrangement and acts between the latter's closed-off end and an adjustment block 140 which has a through bore for passage of the rod 136 and an external thread engaging the casing of the reservoir 8.

The reservoir 8 is connected by means of the pressure connection 10, incorporating the temperature-dependent resistor 52, to the cuff. The cuff in this arrangement is in fact a double cuff assembly, and a second pressure connection 142 connects to the second cuff. Finally, the reservoir has a pressure connection 144 to the pump (not shown).

A pen lift platform (FIG. 3) is screwed to the base plate 108 so as to project slightly above the base plate to allow clearance for the chart 100, as shown most clearly in FIG. 5.

The electrical circuitry of the recorder of FIGS. 3 to 5 is generally the same as shown in FIG. 1, and the operation corresponds. Thus, inflation of the cuff and reservoir causes the bellows arrangement 134 to be compressed. Rod 136 therefore pushes on the ratio arm 130 and turns the lever 22 in a clockwise direction as viewed in FIG. 3, thus moving the pen 30 in the direction of the arrow B on the chart. After the cuff and reservoir has been inflated above the systolic pressure, the falling pressure causes the bellows arrangement 134 to relax, thus drawing the rod 136 into the reservoir 8. The rod 136 therefore pulls on the ratio arm 130, and turns the lever 22 anti-clockwise as viewed in FIG. 3. Pen 30 thus moves in the direction of the arrow A on the chart.

When the blood pressure has fallen to the systolic level, blood flow pulsations in the patient's blood vessel start and, in the manner already described, the resultant air flow pulsations are sensed by the resistor 52 and cause the motor 26 to oscillate. These oscillations are transmitted by the cord 127 to the pulley 114 and cause corresponding oscillations of the pen 30 in the directions of the arrows C and D. When the pressure has fallen to the diastolic level, the pen oscillations decrease in magnitude.

The spring rate of the bellows arrangement 134 is due to the combined effect of the bellows and the compression spring 138. The characteristics of the spring 138 can be better controlled than those of bellows, the swamping effect of the spring 138 thus being beneficial in swamping inevitable variations in different bellows. The insert 140 can be screwed in and out to adjust the effect of the spring 138.

The block 132 can be adjusted along the ratio arm 139, toward and away from the pivot axis 24, so as to adjust the deflection of the pen per unit of pressure. This adjustment alters the angle of operation of the rod 136, and to take account of this, the reservoir 8 is movable, with respect to the base plate 108, in the directions of the arrows E and F.

The pen lift platform 146 contacts a projection 150 (FIG. 5) on the pen arm 114 when the pressure in the reservoir 8 has fallen substantially to zero, and this contact lifts the pen 30 clear of the chart 100, enabling the latter to be removed.

The arrangement shown in FIGS. 3 to 5 is advantageous in that the motor 26 is mounted on the arm 22 on the opposite side of the pivot axis 24 to the pen 30. The position of the motor 26 with respect to the pivot axis of the lever 22 is such that the gravitational moments about the pivot 24 are substantially balanced. In this way, the instrument is made less susceptible to tilt.

The bellows arrangement 134 of FIGS. 3 to 5 may be replaced by a rolling diaphragm type piston-cylinder assembly similar to the assembly 18 of FIG. 1, and this can if desired be mounted actually in the reservoir 8.

The instrument may be provided with limit switches which automatically put the motor 26 into reverse in the event of overtravel due to excessive signals.

Figure 6A:
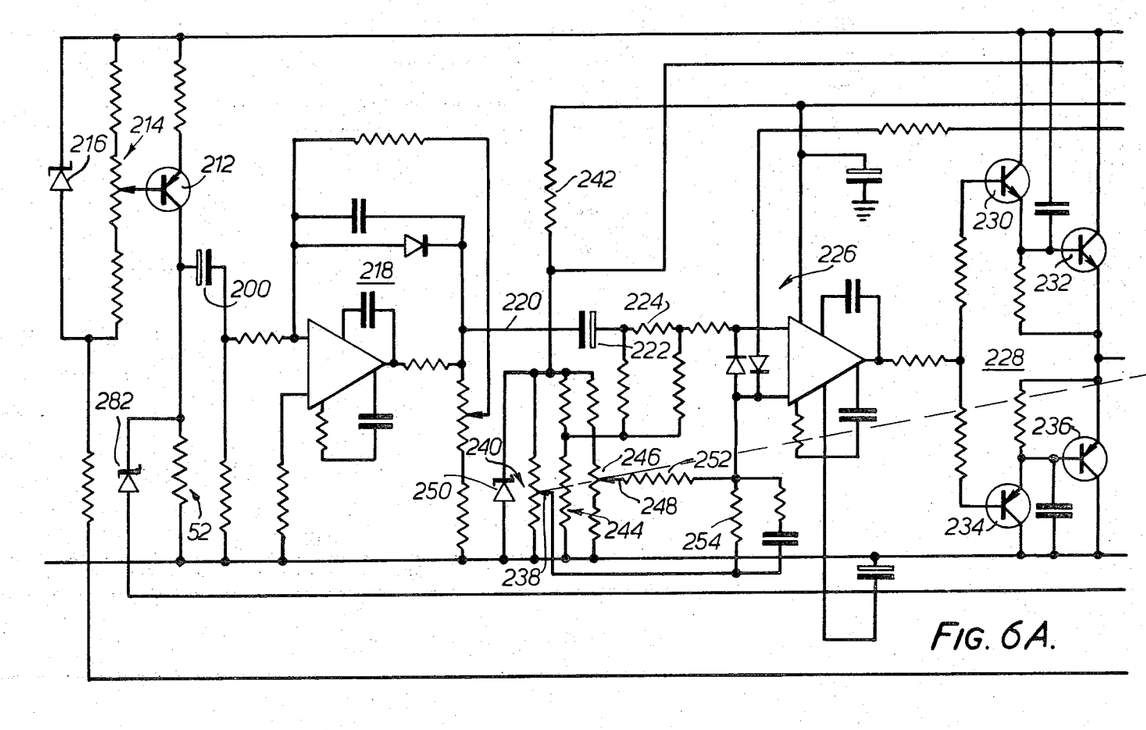
FIGS. 6A and 6B are a detailed circuit diagram of the recorder.
Figure 6B:
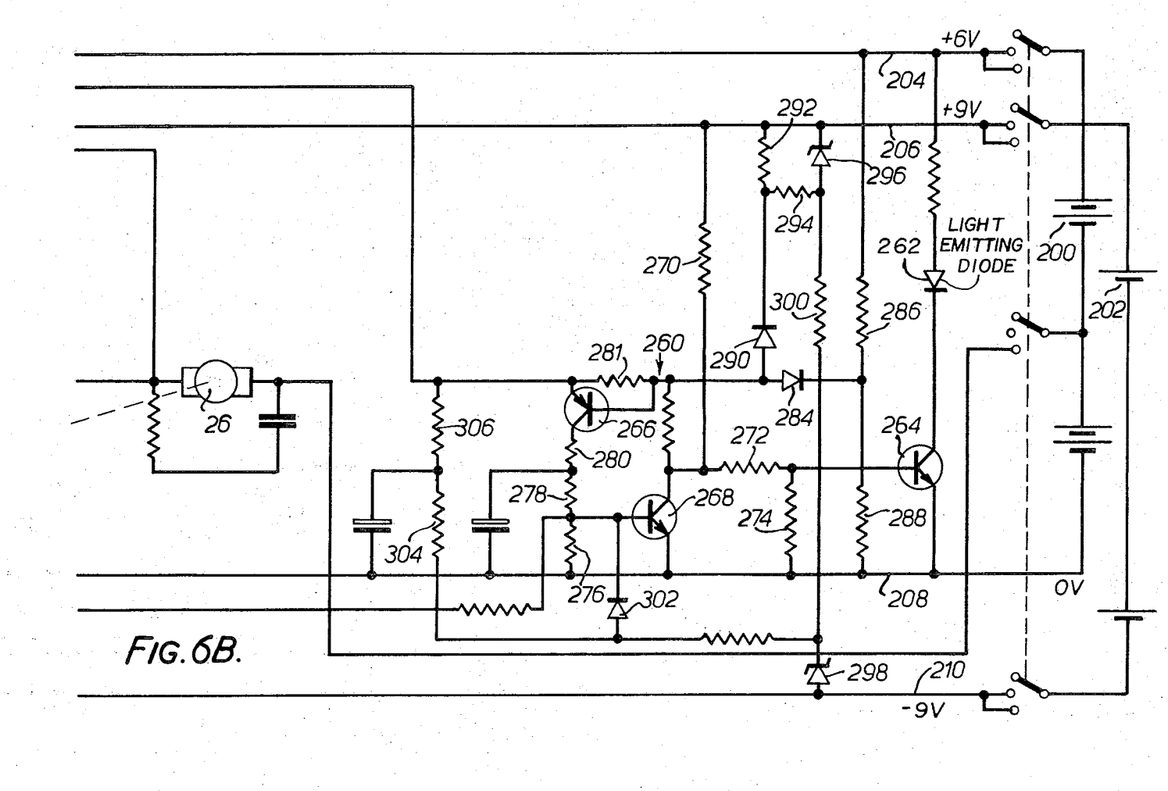

FIGS. 6A and 6B show the detailed circuit diagram of the circuitry in the recorder of FIGS. 1 to 5 for sensing the blood flow pulsations and driving the motor 26.

As shown in FIGS. 6A and 6B, the circuitry is powered by two sets of batteries, a first set 200 and a second set 202, the batteries being connected to provide a +6 volt line 204, a +9 volt line 206, zero volt line 208, and a −9 volt line 210.

The temperature-sensitive resistor 52, for sensing the blood flow pulsations, is energised via a transistor 212, and the current is held constant by means of a potential divider network 214 across which is connected a zener diode 216.

The oscillating voltage produced across the resistor 52 in response to the blood flow pulsations is fed to amplifying network 218 through a coupling capacitor 200, and appears, amplified, on a line 220.

Line 220 feeds the amplified voltage oscillations through a coupling capacitor 222 and a resistor 224 to the negative input of a differential amplifier 226. The output of this amplifier feeds a power amplifier 228 comprising two n.p.n. transistors 230 and 232 and two p.n.p. transistors 234 and 236. The transistors are controlled according to the polarity of the output of the amplifier 226 and energise the pen motor 26.

The slider 238 of a potentiometer 240 is connected to be driven by the motor 26, and the potential divider is energised from the +9 volt line 206 through a resistor 242. The potentiometer 240 is connected in parallel with a fixed potential dividing network 244 and a further potential dividing network 246 which includes a manually adjustable potentiometer 248. Zener diode 250 maintains a substantially constant voltage across the potentiometer 240 and the networks connected in parallel with it. Resistors 252 and 254 detect the difference in potential between the sliders of the potentiometers 238 and 248 and apply it to the positive input of the amplifier 226.

In operation, the potential of the slider of potentiometer 248 balances the potential of the slider of potentiometer 240 when the motor is at rest and no signal is being received from the temperature-dependent resistor 52. Under these conditions, amplifier 226 therefore receives zero input and the motor is unenergised.

When blood flow pulsations are detected, the voltage oscillations produced across the temperature-dependent resistor 52 are amplified and unbalance the input of the amplifier 226. The resultant output of the amplifier adjusts the power amplifier 228 so as to drive the motor 26 in such a direction that the change in potential produced on the moving slider 238 reduces the input of amplifier 226 back to zero. In this way, the motor is caused to oscillate in correspondence with the voltage oscillations developed across resistor 52.

The slider of potentiometer 248 is manually adjusted to position the pen suitably on the recording card.

The circuitry of FIGS. 6A and 6B includes a subsidiary circuit 260 for giving an indication when certain fault conditions arise including low battery voltage. The subsidiary circuit 260 incorporates a light emitting diode 262 which is connected in series with a transistor 264 between the lines 204 and 208. Transistor 264 is controlled by two transistors 266 and 268 and, in the absence of fault conditions, is conductive so as to energise the diode 262 which therefore produces a light output.

The base of transistor 264 is connected to a point on a potential divider comprising resistors 270, 272 and 274, and, with transistors 268 non-conducting, the base potential of transistor 264 is such as to maintain the latter conducting.

The base of transistor 268 is connected to a point on a network comprising resistors 276, 278, 280 and transistor 266, and this network is connected across the zener diode 250. In addition, the base of transistor 268 is connected across the temperature-dependent resistor 52 via a further zener diode 282.

The base of transistor 266 is connected via a diode 284 to the junction of two resistors 286 and 288 which are connected between lines 204 and 208. In addition, it is connected to a further diode 290 and a resistor 292 to the line 206, and, via a resistor 294, to a network comprising two zener diodes 296 and 298 and a resistor 300. This network is connected to the base of transistor 268 through a diode 302 and also to the collector of transistor 266 through resistors 278 and 280. The base and emitter of transistor 266 are connected by a resistor 281.

In operation, failure (that is, open-circuiting) of the temperature-dependent resistor 52 causes the zener diode 282 to break down and to raise the base of transistor 268. This transistor thereupon conducts and renders transistors 264 nonconductive thus switching off the diode 262.

As the −9v supply falls (with age for example) the voltage at the junction of resistor 304 and diode 302 will become less negative and eventually positive enough to provide base current for transistor 268 which becomes conductive to switch off transistor 264. Again, therefore, the diode 262 is extinguished.

If the +9 volt supply falls below a predetermined level, diode 290, which is normally back-biased, becomes forward-biased. Current therefore flows through resistor 281 and switches on transistor 266. This switches on transistor 268 and the latter switches off transistor 264 and extinguishes the light 262.

Diode 284 is normally back-biased and non-conductive. When the voltage of the batteries 200 falls below an acceptable level, however, it becomes forward-biased and renders transistor 266 conductive. This renders transistor 268 conductive and switches off transistor 264 and the diode 262.

What is claimed is:

1. Apparatus for clinical measurement of systolic and diastolic blood pressure in a cardio-vascular system, comprising
   cuff means for encircling part of the patient where the blood pressure is to be determined,
   housing means,
   a reservoir mounted on the housing means,
   pump means in pressure connection with the reservoir for pressurizing the reservoir,
   means placing the reservoir in pressure connection with the cuff means for temporarily storing pressure in the reservoir and in the cuff means above the systolic level,
   means defining a pressure leak allowing the reservoir and cuff pressure to fall progressively,
   a lever pivotally mounted on the housing means,
   a recording medium marking stylus,
   means movably mounting the stylus on the lever at a position spaced from the pivot axis of the lever, and permitting the stylus to move relative to the lever in directions transverse to the directions of movement of the lever,
   first pressure-responsive means in pressure connection with the reservoir and the cuff means to sense the actual pressure therein and connected to the lever to point the lever about its pivot axis in response to changes in the sensed pressure,
   an electric motor mounted on the lever adjacent the pivot so that its weight produces substantially no moment about the pivot axis tending to assist the moment produced thereabout by the weight of the stylus,
   means drivingly connecting the motor to the stylus so that the motor moves the stylus when energised, and
   second pressure-responsive means responsive to pressure variations in the cuff means, caused by blood pulsations in the said part of the patient as the cuff pressure falls, to energise the motor correspondingly.

2. Apparatus according to claim 1, in which the motor is mounted at the pivot axis of the lever.

3. Apparatus according to claim 1, in which the motor mounting means comprises means mounting the motor on the opposite side of the pivot axis to the stylus at such a distance from the pivot axis that the gravitational moments acting on the lever and tending to turn it in opposite directions about the pivot axis substantially balance.

4. Apparatus according to claim 1, in which the first pressure-responsive means comprises means producing a mechanical force acting on the lever at a point between its pivot axis and the stylus.

5. Apparatus according to claim 1, including an arm which is shorter than the lever but is attached thereto and extends in the same general direction as the lever, and in which the first pressure-responsive means comprises force-applying means connected to the said arm and applying a mechanical force thereto and thence to the lever.

6. Apparatus according to claim 5, including means adjustably connecting the said force-applying means to the said arm to adjust the point at which the force-applying means acts on the said arm along the length of the arm.

7. Apparatus according to claim 1, in which the first pressure-responsive means is mounted within the reservoir.

8. Apparatus according to claim 1, in which the first pressure-responsive means comprises a piston-cylinder assembly in pressure communication with the reservoir, the piston being of the rolling-diaphragm type.

9. Apparatus according to claim 1, in which the first pressure-responsive means comprises
   a bellows arrangement mounted in the housing means,
   means connecting the bellows arrangement so that the pressure in the reservoir and the cuff means acts between the inside and outside of the bellows, and
   a spring connected to the bellows arrangement to oppose movement thereof in one direction, the rate of the spring being such as to swamp the resilience of the bellows.

10. Apparatus according to claim 1, including
    a platform mounted on the housing means and supporting a recording medium adjacent the said stylus for marking thereby as the stylus moves, and
    a lifter member mounted adjacent the recording medium for contacting part of the stylus when the said lever moves to a position corresponding to a reservoir and cuff pressure less than the diastolic pressure, the said contact moving the stylus clear of the recording medium.

11. Apparatus according to claim 1, in which the second pressure-responsive means comprises transducing means responsive to the said pressure variations to develop corresponding an electrical signal, and means for energising the electric motor on the lever in dependence on this signal.

12. Apparatus according to claim 11, including means responsive to the instantaneous position of the shaft of the motor on the lever to generate a further electrical signal dependent thereon, amplifying means responsive to the said electrical signal developed by the transducing means and to the said further electrical signal to develop an electrical power output dependent on the difference between them, and
    means responsive to the electrical power output to energise the motor in a direction tending to reduce the difference between the inputs to the amplifying means to zero.

13. Apparatus for clinical measurement of systolic and diastolic blood pressure in a cardio-vascular system, comprising:
    cuff means for encircling part of the patient where the blood pressure is to be determined,
    housing means,
    a reservoir mounted on the housing means,
    pump means in pressure communication with the reservoir for pressurizing the reservoir,
    means placing the reservoir in pressure communication with the cuff means so that the reservoir temporarily stores pressure in itself and in the cuff means above the systolic level,
    means defining a pressure leak allowing the reservoir and cuff pressure to fall progressively, a lever pivotably mounted on the housing means, a recording medium marking stylus, means movably mounting the stylus on and spaced from the pivot axis of the lever and allowing movement of the stylus relative to the lever in directions transverse to the directions of pivotting lever movement, first pressure-responsive means responsive to the pressure in the reservoir and the cuff to produce a corresponding signal indicative of a demanded position of the said lever, servo means responsive to the said signal and to the position of the lever to produce a mechanical power output dependent on their relative values, means drivingly connecting the servo means to the lever to apply the mechanical power output of the servo means to the lever to change the angular position of the lever in correspondence with the value of the said signal whereby the movement of the lever follows the reservoir and the cuff pressure, an electric motor mounted on the lever, means drivingly connecting the electric motor to move the stylus in the said transverse directions, and second pressure-responsive means responsive to the pressure variations in the cuff means which are superimposed on the reservoir and cuff pressure, and caused by blood pulsations in the said part of the patient as the cuff pressure falls, to energise the electric motor whereby to oscillate the marking element in the said transverse direction.

14. Apparatus according to claim 13, including first and second electrical contacts mounted on the said lever at spaced positions thereon to define a gap between them and to move together with the lever, a third electrical contact, means movably mounting the third electrical contact in the said gap for movement in a first direction towards and into engagement with the first contact and a second, opposite, direction towards and into engagement with the second contact, means movably connecting the first pressure responsive means to the third electrical contact to move the third electrical contact in a direction dependent on the said cuff and reservoir pressure to a position representing the said demanded lever position, and as part of the said servo means, a source of electrical potential difference connected to apply a potential difference between the first and second contacts, circuit means electrically connected between the third contact and the said source to pick off an electrical voltage from the third contact having a polarity dependent on the one of the first and second contacts engaged by the third contact, a servo motor, means drivingly connecting the servo motor to the lever to pivot the lever about its pivot axis, and means responsive to the picked-off voltage to energise the servo motor.

* * * * *